2,912,380

DRILLING FLUIDS AND METHOD OF PREVENTING LOSS THEREOF FROM WELL HOLES

Kenneth Deane Groves, Bryn Mawr, Pa., assignor to American Viscose Corporation, Philadelphia, Pa., a corporation of Delaware No Drawing. Application July 17, 1953
Serial No. 368,808

7 Claims. (Cl. 252—8.5)

This invention is concerned with improved compositions and methods for preventing loss of fluids from well holes. It is more particularly concerned with improved cement slurries, drilling muds or the like adapted to seal pores, crevices or fissures in the surrounding earth during the operation of drilling wells, especially oil wells.

In accordance with the invention, the drilling fluid which is preferably of the water-clay or water-shale type, including kaolin-type clays, bentonite-type clays or mixtures thereof, or even settable cements, shales or other earth-like solids is supplied with a mixture of fibrous and granular material in amounts which may vary from two to three pounds per barrel of the drilling fluid up to thirty pounds or more per barrel thereof. The mixed fibrous-granular material that is added serves as a plugging and sealing agent for the pores, cracks, fissures or the like. It comprises a mixture of cellulosic fibers and generally flat but irregularly shaped plastic masses formed of substances which are less hydrophilic than cellulose and preferably essentially hydrophobic. For example, the granules may be formed of cellulose esters, such as cellulose acetate or they may be formed of essentially hydrophobic vinyl resins, such as polymers of vinyl chloride, acrylonitrile, vinyl acetate, ethylene, trifluorochloroethylene, tetrafluoroethylene, or copolymers of vinyl monomers such as copolymers of vinyl chloride with vinyl acetate or acrylonitrile, copolymers of acrylonitrile with vinylidene chloride, vinyl chloride, vinyl pyridine, methacrylonitrile, vinyl acetate or with any two or more of such comonomers. Other materials, such as nylons, particularly of the polyamide type may be used. Besides thermoplastic types of materials, plastics of the thermosetting type may be used such as urea-formaldehyde, melamine-formaldehyde, phenol-formaldehyde condensates in the thermoplastic condition. These latter materials gradually harden and cure at temperatures occurring in the depths of the well. All of these materials are of high molecular weight and capable of producing films or filaments and they are present in the fibrous-granular mixture as compacted masses of irregular thickness and outline, preferably somewhat flattened. The fibers may be partially coated with the same material as that from which the granules are formed and a large proportion of the granules contain cellulosic fibers and have at least some of the fibers projecting from the surfaces of the granules.

The cellulosic fibers may be of regenerated cellulose rayon, cotton, wood fibers, or other vegetable fibers such as those obtained from sugar cane, flax, or the like. This mixture of fibers with granules, at least some of which have fibrous protuberances from their surfaces has the characteristic of clumping-up into wads which rapidly seal and plug the crevices and fissures of the earth formations such as are encountered during the drilling of wells. At the same time, they have the characteristic of readily breaking apart by the flowing of the drilling fluid through the well bore. This characteristic is advantageous in reducing the tendency to "cake" within the well bore itself. Also, any caked material is readily sheared by the action of the well drilling tools when they are removed or inserted into the well, thereby preventing jamming thereof.

The mixed fibrous-granular material may be produced in many ways. For example, a flowing suspension of fibers, having a length from about ¼ of an inch to 10 inches or more, in a gaseous medium may be sprayed with a plastic material by means of a spray gun which is adjusted to produce small blobs of the plastic of varying dimensions. The plastic material may be dissolved in a solvent or heated to its melting point to prepare it for the spraying operation and the sprayed granules or blobs solidify while in contact with the fibers so that some of the fibers may be embedded in the plastic blobs and at least some of the plastic blobs have fibrous fibers protruding from their surfaces. Upon cooling or evaporation of the solvent, the blobs set with the fibers embedded or protruding therefrom and, after collection of the mixture, such as upon a stationary screen, a traveling screen or the like, the mass may be passed through nip rolls to flatten the blobs somewhat.

If desired, the mixture may be subjected to a disintegrating action, such as in a hammer mill, a ball and jewel mill or any other type of disintegrator suitable for reducing the length of the fibers and cutting the blobs. The disintegration may be effected whether or not the flattening is performed and the disintegrated product may be sorted by screening into various grades. For example, in one grade, the fibers may vary from ⅛ of an inch down to practically a powder form in length and the granules up to about ⅛ of an inch in their maximum dimension with a thickness thereof from ¹⁄₆₄ to ¹⁄₁₆ of an inch. Another grade may contain a mixture of granules having dimensions up to ¾ of an inch maximum and thicknesses of ¹⁄₆₄ to ¹⁄₁₆ of an inch mixed with fibers having lengths up to ¾ of an inch and down to practically powder condition. An even coarser grade may have fibers up to three or four inches in length or more and granules up to an inch or more in length. In all cases, the granules are of irregular thickness and irregular outline and at least some of them have numerous fibrous projections from their surfaces.

The fibrous-granular mixture may also be obtained by saturating a cellulose fabric, such as of cotton, or a wadding, pad, batt, web or the like of cellulosic fibers, such as of cotton, with a plastic melt or solution which is set upon the impregnated material by cooling or evaporation and then disintegrated. This leaves the product in the form of a mixture of fibers, many of which have plastic material adhered to their surfaces such as in the form of a film or coating or as particles or irregular generally flattened granules.

Another excellent source of the fibrous-granular mixture is from the waste filter media used for filtering plastic masses or solutions to prepare them for spinning, molding, or otherwise forming various masses, such as fibers, films, sheets, rods, tubes, etc. When such filters comprise a cellulosic fabric or wadding, such as of cotton, regenerated cellulose or the like, the filter eventually becomes clogged with the plastic material and must be discarded. The discarded filtered mass can be disintegrated or suitably cut up to provide a mass of the type described hereinabove. Common plastic materials that are thus filtered include cellulose acetate solutions in acetone, vinyl resin solutions, such as copolymers of vinyl chloride and vinyl acetate in acetone, and in some cases thermosetting resin solutions, such as those of urea-formaldehyde.

In many cases, it may be desired to incorporate more than one plastic material. For example, it may be desirable to incorporate a combination of thermoplastic material with a thermosetting material. Such a material can be prepared by spraying the fibers twice with separate solutions of the two plastic materials or by spraying a mixed solution thereof or a waste filter material of the type mentioned above may be provided with a coating of the additional plastic material before it is disintegrated.

The proportions of the fibers to the plastic blobs or granules may vary between 25 to 75% of each, and a mixture having 50% of each is especially valuable. The cellulosic fibers being of hydrophilic character tend to swell somewhat after being incorporated into the drilling fluid so that they tend to seal the pores and very fine fissures and cracks when once they become lodged therein. The plastic blobs tend to become somewhat tacky, especially in the depths of the earth where temperatures rise to various extents ranging up to as much as 300° F. in some places so that when such blobs become somewhat tacky as a result of rise in temperature, they tend to adhere to the surfaces of the larger crevices and fissures and by virtue of this tackiness as well as the inter-entangling effect of the protruding fibers, large clumps quickly build up in the larger crevices and plug them effectively after which the fibers become deposited and substantially seal the remaining small openings.

The mixed fibrous-granular material of the present invention has been found to be quite effective in plugging and sealing the earth formations surrounding well bores and in many instances these materials are superior to previously known plugging material, such as cellophane flakes or mica and mixtures of loose fibers and sawdust. Their improved effectiveness seems to be attributable to the rough character of the surfaces of the granules as well as to the thermoplastic character thereof tending to render them tacky at the somewhat elevated temperatures that occur within the well. By virtue of the effectiveness of the fibrous-granular material in both sealing and plugging actions, their use cuts down the water loss as well as circulation loss.

The granular-fibrous material is easily mixed into the drilling fluids and remains suspended over long periods unless steps are taken to remove it and they have the advantage over such materials as cotton seed hulls that there is no tendency to ferment.

To illustrate the invention, the conventional drilling operation generally uses a hollow drill stem to which is attached a rotary bit which drills the hole. During the rotation of the drill, there is circulated down the hollow drill stem a fluid, such as an aqueous suspension of finely divided solids of earth-like nature, such as shale, clay, or clay-like material some or all of which may be bentonite which has the well-known property of swelling highly in water. The fluid is discharged from the drill stem at the cutting head of the drill and there mingles with the cuttings produced by the drill bit. The mixture of cuttings and circulating fluid flows up the well hole and there is discharged to a mud pit. As it passes to the pit, it may be screened to remove cuttings and any remaining plugging material. The mud is returned from the pit to the drill stem for recirculation to the well hole and when water loss or circulation loss occurs, some of the fibrous-granular material is introduced into the mud at some point between the mud pit and the drill stem. It may be introduced directly into a suitable branch connection to the suction side of the customary pump used to feed the mud to the drill stem. If a mere water loss is involved, a relatively small proportion of a finer grade, such as the first one mentioned hereinabove of the mixed granular-fibrous material is used. It is introduced in an amount of about two to three pounds per barrel at the start and if the water loss is not quickly overcome, larger amounts are used. If the use of thirty pounds per barrel of the fine grade material is not successful, a coarser grade is used. In cases of loss of circulation, it is generally desirable to start with a coarser grade such as the second grade of those mentioned hereinabove. Again, it is used in relatively small amounts at first and thereafter in larger and larger amounts until the plugging is effected, coarser grades being finally used if necessary.

The fibrous-granular material can be used without upsetting the normal alkalinity of the drilling fluids. Viscosity-modifying and bulking agents of the conventional type can be employed such as the phosphates, quebracho, caustic, barium sulfate, etc. The sealing and plugging materials of the present invention may be incorporated in drilling cements and other drilling fluids as well as the conventional drilling mud used to lubricate and cool the bit. For example, the plugging material may be incorporated in a water slurry of Portland cement, plaster of Paris or other settable cementing material.

It is to be understood that changes and variations may be made without departing from the spirit and scope of the invention as defined in the appended claims.

I claim:

1. A composition for sealing permeable formations encountered in the drilling of a well comprising a well mud fluid to which has been added hydrophilic cellulosic fibers and granules of a thermoplastic cellulose ester having hydrophilic cellulosic fibers partially imbedded therein.

2. A composition as defined in claim 1 wherein the fibers are cotton and the thermoplastic ester is cellulose acetate.

3. A composition as defined in claim 1 wherein the fibers are regenerated cellulose fibers and the thermoplastic ester is cellulose acetate.

4. A method of restraining a fluid against escape from a well hole through the wall thereof which comprises introducing into the well hole and incorporating in the fluid a substantial quantity of a mixture of hydrophilic cellulosic fibers and thermoplastic cellulose ester granules having hydrophilic cellulosic fibers protruding therefrom.

5. A method as defined in claim 4 in which the fluid is a drilling mud containing between two and thirty pounds of the mixture of fibers and granules per barrel of drilling mud.

6. A method as defined in claim 4 in which the fibers are of cotton and the thermoplastic is cellulose acetate.

7. A method as defined in claim 4 in which the fibers are of regenerated cellulose and the thermoplastic is of cellulose acetate.

References Cited in the file of this patent

UNITED STATES PATENTS

| 2,353,372 | Stone | July 11, 1944 |
| 2,502,191 | Williams | Mar. 28, 1950 |
| 2,599,745 | Campbell et al. | June 10, 1952 |
| 2,650,195 | Cardwell et al. | Aug. 25, 1953 |

OTHER REFERENCES

Rogers: Composition and Properties of Oil Well Drilling Fluids, revised edition, pp. 562 and 563, pub. 1953 by Gulf Pub. Co.